United States Patent Office 2,961,417
Patented Nov. 22, 1960

2,961,417

METHOD OF MANUFACTURING NON-AGGLOMERATING MIXED BED ION EXCHANGE RESINS AND PRODUCTS THEREOF

Hamish Small, Midland, Mich., assignor to The Dow Chemical Company, Midland, Mich., a corporation of Delaware No Drawing. Filed Sept. 4, 1956, Ser. No. 607,552

13 Claims. (Cl. 260—2.1)

This invention concerns a method for preventing agglomeration of mixed bed ion exchange resins and its products, non-agglomerating mixed bed ion exchange resins. More particularly it concerns a method for neutralizing the surface charges of the anion or the cation exchanging component of mixed bed resins by treating the one or the other with an oppositely charged water-soluble resinous polyelectrolyte, and as products mixed bed non-agglomerating ion exchange resins.

The use of mixed bed ion exchange resins for deionization of solutions has attained widespread use. Because of surface interactions between the cationic and anionic resin particles, large clumps or agglomerates of resin are formed which lead to poor flow distribution in the bed and hence inefficient operation. The problem is most severe when an attempt is made to use cation and anion exchange resins in the "as shipped" or unregenerated condition. Various expedients have been used to overcome this undesirable clumping. These include backwashing and contact with a strong brine solution. All attempts to break the attraction of the resin particles are wasteful of process time and treating solutions. Until now no controlled method was known for preventing the clumping which results when cation and anion exchange resins are mixed in water.

It has now been discovered that the interaction of the anion and cation exchange resins may be overcome by treating the anion exchanging component of the mixed bed with an aqueous solution of an anionic resinous polyelectrolyte or by treating the cation exchanging resin component of the mixed bed with an aqueous solution of a cationic resinous polyelectrolyte. This treatment is effective in substantially neutralizing the surface charges of the respective resins.

In practice, the amount of water-soluble polyelectrolyte to be added to either component of the mixed bed is most readily determined experimentally. Once determined, it does not vary significantly from one ion exchanger to another of the same type or charge. After treating the resin, the interstitial polyelectrolyte solution is simply drained off, and, if desired, the resin may be water washed to remove any excess unreacted polyelectrolyte solution. The substantial neutralization of surface charges of either ion exchanger of the mixed bed has been attained when a test mixed bed shows no clumping. By reason of their molecular size, resinous polyelectrolyte molecules do not diffuse into the resin particles but neutralize only the surface charges. Generally, about 1 equivalent of polyelectrolyte to about 4,000 to 6,000 equivalents of resin suffices. The water-soluble polyelectrolyte is advantageously used as an aqueous 0.1 to 10 percent by weight solution, preferably as a 0.1 to 1 percent solution.

The preferred water-soluble anionic resinous polyelectrolyte is resinous polymeric styrene sulfonate. Other well-known water-soluble, anionic, resinous, polyelectrolytes can be used, such as the resinous polymeric acrylic acid, polymethacrylic acid and polymeric maleic acid types. Corresponding copolymeric types of the resinous polyelectrolytes may be used. The preferred water-soluble, cationic resinous polyelectrolyte is resinous polymeric vinylbenzyltrimethyl-ammonium chloride. Other well-known water-soluble, cationic, resinous polyelectrolytes can also be used, such as polymeric vinylbenzyldimethylethanolammonium chloride, the water-soluble polyamine resinous types, and the like.

The following are examples of preferred embodiments of this invention which show advantages accruing from its practice.

Example 1

A quantity of 20 grams of 20–50 U.S. standard screen mesh size granules of an anion exchanging resin comprising a cross linked vinylaromatic copolymer containing quaternary ammonium substituents was placed in 100 ml. of water, and to it was added 2 ml. of a 0.1 percent by weight solution of a water-soluble resinous polystyrene sulfonate.

On a weight basis, the proportion of anion exchanger to soluble polystyrene sulfonate was 10,000 to 1, while on a capacity or equivalent basis, the proportion of anion exchanger to soluble polyelectrolyte was 3500 to 1. The resin mixture was stirred for 2 minutes, filtered free of solution and water-washed. When the so-treated anion exchanger was mixed with 10 grams of the sodium form of insoluble 20–50 mesh nuclearly sulfonated styrene-divinylbenzene copolymer in 100 ml. of water to form a mixed bed of ion exchanging resins, there was not evidence of agglomeration. Complete classification of such mixed bed into its components was achieved by backwashing the mixed bed. A similar blank in which neither ion exchanger was pre-treated clumped so badly as to be useless.

Example 2

A quantity of 20 grams of 20–50 mesh size granules of a cation exchanging resin, insoluble nuclearly sulfonated styrene-divinylbenzene copolymer was placed in 100 ml. of water, and to it was added 1 ml. of a 0.2 percent by weight solution of water-soluble resinous polyvinylbenzyltrimethylammonium chloride. On a weight basis, the proportion of cation exchanger to soluble polyelectrolyte was 10,000 to 1, while on a capacity basis, the proportion of cation exchanger to soluble polyelectrolyte was 5600 to 1. The resin mixture was stirred for 2 minutes, filtered free of solution and water-washed. When the so-treated cation exchanger was mixed with 40 grams of insoluble 20–50 mesh polyvinylbenzyltrimethylammonium chloride in 200 ml. of water to form a mixed bed of ion exchanging resins, there was no evidence of agglomeration. In contrast thereto, a similar blank in which neither ion exchanger was pre-treated clumped badly.

Example 3

A quantity of 10 grams of 20–50 mesh size granules of a cation exchanging resin, nuclearly sulfonated styrenedivinylbenzyl copolymer, was placed in 50 ml. of water and to it was added 2 ml. of a 0.1 percent by weight solution of a water-soluble resinous polyvinylbenzyltrimethylammonium chloride. On a weight basis, the proportion of cation exchanger to soluble polyelectrolyte was 10,000 to 1, while on a capacity basis, the proportion of cation exchanger to soluble polyelectrolyte was about 6,000 to 1. The resin mixture was stirred for 2 minutes, filtered free of solution and water-washed. When the so-treated cation exchanger was mixed with 10 grams of a weakly basic anion exchanger, a cross-linked polymeric styrene with primary and secondary amine substituents, in 50 ml. of water to form a mixed bed of ion exchanging resins, there was no evidence of agglomeration. In contrast thereto, a similar blank in which neither ion exchanger was pre-treated clumped badly.

*Example 4*

A quantity of 10 grams of 20–50 mesh size granules of a cation exchanging resin, nuclearly sulfonated styrenedivinylbenzene copolymer, was placed in 50 ml. of water and to it was added 2 ml. of a 0.1 percent by weight solution of a water-soluble resinous polyvinylbenzyltrimethylammonium chloride. On a weight basis, the proportion of cation exchanger to soluble polyelectrolyte was 10,000 to 1, while on a capacity basis, the proportion of cation exchanger to soluble polyelectrolyte was about 6,000 to 1. The resin mixture was stirred for 2 minutes, filtered free of solution and water-washed. When the so-treated cation exchanger was mixed with 10 grams of a weakly basic anion exchanger, a phenolic resin having amine substituents, in 50 ml. of water to form a mixed bed of ion exchanging resins, there was no evidence of agglomeration. In contrast thereto, a similar blank in which neither ion exchanger was pre-treated, clumped badly.

*Example 5*

A quantity of 10 grams of 20–50 mesh granules of a cation exchanging resin, a polymeric phenolsulfonic acid-formaldehyde type, was placed in 50 ml. of water and to it was added 2 ml. of a 0.1 percent by weight solution of a water-soluble resinous polyvinylbenzyltrimethylammonium chloride. The resin mixture was stirred for 2 minutes, filtered free of solution and water-washed. When the so-treated cation exchanger was mixed with 20 grams of insoluble 20–50 mesh polyvinylbenzyltrimethylammonium chloride in 100 ml. of water to form a mixed bed of ion exchanging resins, there was no evidence of agglomeration. In contrast thereto, a similar blank in which neither ion exchanger was pre-treated clumped badly.

*Example 6*

A quantity of 10 grams of 20–50 mesh granules of a cation exchanging resin, a polymeric phenolsulfonic acid-formaldehyde type, was placed in 50 ml. of water and to it was added 2 ml. of a 0.1 percent by weight solution of a water-soluble resinous polyvinylbenzyltrimethylammonium chloride. The resin mixture was stirred for 2 minutes, filtered free of solution and water-washed. When the so-treated cation exchanger was mixed with 10 grams of a weakly basic anion exchanger, a cross-linked polymeric styrene having primary and secondary amine substituents, in 50 ml. of water to form a mixed bed of ion exchanging resins, there was no evidence of agglomeration. In contrast thereto, a similar blank in which neither ion exchanger was pre-treated clumped badly.

*Example 7*

A quantity of 10 grams of 20–50 mesh granules of a cation exchanging resin, a polymeric phenolsulfonic acid-formaldehyde type, was placed in 50 ml. of water and to it was added 2 ml. of a 0.1 percent by weight solution of a water-soluble polyvinylbenzyltrimethylammonium chloride. The resin mixture was stirred for 2 minutes, filtered free of solution, and water-washed. When the so-treated cation exchanger was mixed with 10 grams of a weakly basic anion exchanger, a phenolic resin having amine substituents, in 50 ml. of water to form a mixed bed of ion exchanging resins, there was no evidence of agglomeration. In contrast thereto, a similar blank in which neither ion exchanger was pre-treated clumped badly.

What is claimed is:

1. A method for making non-agglomerating mixed bed ion exchange resins by treating an ion exchange resin with a solution of a water-soluble resinous polymeric polyelectrolyte, the polymeric moiety of which is oppositely charged with respect to the charges of the ion exchanging sites of the ion exchange resin in amount sufficient substantially to neutralize surface charges of said treated ion exchange resin and mixing said treated ion exchange resin with another ion exchange resin which exchanges ions opposite in charge to those exchanged by the treated ion exchange resin.

2. The method of claim 1 wherein the cation exchanger of the mixed bed is pre-treated with a water-soluble resinous polymeric polyelectrolyte, the polymeric moiety of which is cationic.

3. The method of claim 1 wherein the anion exchanger of the mixed bed is pre-treated with a water-soluble resinous polymeric polyelectrolyte, the polymeric moiety of which is anionic.

4. The method of claim 1 wherein the mixed bed ion exchanger comprises a strongly basic quaternary ammonium anion exchange resin.

5. The method of claim 1 wherein the mixed bed ion exchanger comprises a strongly acid nuclearly sulfonated vinylaromatic cation exchange resin.

6. The method of claim 4 wherein the anion exchanger is pre-treated with a water-soluble resinous polystyrene sulfonate in amount sufficient substantially to neutralize surface charges.

7. The method of claim 5 wherein the cation exchanger is pre-treated with a water-soluble resinous polyvinylbenzyltrimethylammonium chloride in amount sufficient substantially to neutralize surface charges.

8. A non-agglomerating mixed bed ion exchanging resin which comprises a mixture of an anion exchanger and a cation exchanger, one of which has been pre-treated with a water-soluble, resinous, polymeric, polyelectrolyte, the polymeric moiety of which is oppositely charged with respect to the charge of the ion exchanging sites of one of the ion exchanging resins, in amount sufficient substantially to neutralize surface charges of said pre-treated ion exchanger.

9. The product of claim 8 wherein the mixed bed ion exchanger comprises a strongly basic quaternary ammonium anion exchanger.

10. The product of claim 8 wherein the mixed bed ion exchanger comprises a strongly acid sulfonated vinylaromatic cation exchanger.

11. A non-agglomerating mixed bed ion exchanging resin which comprises a strongly basic quaternary ammonium anion exchanger and a strongly acid sulfonated vinylaromatic cation exchanger, one of which has been pre-treated with a water-soluble, resinous, polymeric, polyelectrolyte, the polymeric moiety of which is oppositely charged with respect to the charge of the ion exchanging sites of one of the ion exchanging resins, in amount sufficient substantially to neutralize surface charges of said pre-treated ion exchanger.

12. A non-agglomerating mixed bed ion exchanging resin which comprises a strongly basic quaternary ammonium anion exchanger and a strongly acid sulfonated vinylaromatic cation exchanger, the surface charges of the anion exchanger having been substantially neutralized by chemically absorbed, originally water-soluble, resinous, polystyrene sulfonate anionic moieties.

13. A non-agglomerating mixed bed ion exchanging resin which comprises a strongly basic quaternary ammonium anion exchanger and a strongly acid sulfonated vinylaromatic cation exchanger, the surface charges of the cation exchanger having been substantially neutralized by chemically absorbed originally water-soluble, resinous, polyvinylbenzyl trimethylammonium cationic moieties.

References Cited in the file of this patent

UNITED STATES PATENTS

| | | |
|---|---|---|
| 2,518,420 | Evers | Aug. 8, 1950 |
| 2,614,085 | Lundberg | Oct. 14, 1952 |
| 2,855,371 | Abrams | Oct. 7, 1958 |